United States Patent
Marcus et al.

(10) Patent No.: US 8,612,281 B1
(45) Date of Patent: Dec. 17, 2013

(54) SYSTEM AND METHOD FOR PRODUCING AND DISTRIBUTING AUDIO-VISUAL CONTENT

(71) Applicant: Lions Gate Entertainment Inc., Santa Monica, CA (US)

(72) Inventors: Mort Marcus, Los Angeles, CA (US); Ira Bernstein, Bedford Corners, NY (US)

( * ) Notice: Subject to any disclaimer, the term of this patent is extended or adjusted under 35 U.S.C. 154(b) by 0 days.

(21) Appl. No.: 13/673,465

(22) Filed: Nov. 9, 2012

Related U.S. Application Data

(63) Continuation of application No. PCT/US2012/062333, filed on Oct. 27, 2012.

(51) Int. Cl.
*G06Q 30/02* (2012.01)

(52) U.S. Cl.
CPC ............... *G06Q 30/02* (2013.01)
USPC .................................................. 705/7.29

(58) Field of Classification Search
CPC ............ G06Q 30/0201; G06Q 30/02
USPC .................................................... 705/7.29
See application file for complete search history.

(56) References Cited

U.S. PATENT DOCUMENTS

| | | | |
|---|---|---|---|
| 6,029,176 A | | 2/2000 | Cannon |
| 7,512,318 B2* | | 3/2009 | Tanikawa ............... 386/291 |
| 7,640,561 B1 | | 12/2009 | Halke et al. |
| 7,885,887 B2 | | 2/2011 | Camelio |
| 8,311,382 B1* | | 11/2012 | Harwell et al. ........... 386/200 |
| 2002/0019792 A1 | | 2/2002 | Maerz et al. |
| 2002/0178442 A1* | | 11/2002 | Williams ................. 725/13 |
| 2004/0078314 A1 | | 4/2004 | Maerz et al. |
| 2007/0039018 A1* | | 2/2007 | Saslow et al. ............ 725/22 |
| 2007/0239883 A1* | | 10/2007 | Glenn ..................... 709/231 |
| 2007/0288350 A1* | | 12/2007 | Bykowsky ............... 705/37 |
| 2008/0016012 A1 | | 1/2008 | Stancombe et al. |
| 2009/0055385 A1 | | 2/2009 | Jeon et al. |
| 2009/0059010 A1 | | 3/2009 | Wang et al. |
| 2009/0094631 A1* | | 4/2009 | Whymark et al. ......... 725/22 |

(Continued)

OTHER PUBLICATIONS

Chad Gervich, Small Screen, Big Picture: A Writer's Guide to the TV Business, MediaBistro, Published by Three Rivers Press, 2008, http://books.google.com/books?id=nUcmlUOYH-MC&pg=PT56&lpg=PT56&dq=number+of+episodes+needed+for+syndication&source=bl&ots=j22dAvKFvk&sig=cXp0Q5GBycH2VXGgPvLT9QCov6A&hl=en&sa=X&ei=c9eDUfmPOlaS0QHo9oHwBg&output=reader.*

International Search Report and Written Opinion of the International Searching Authority issued in PCT/US12/62333 dated Jan. 2, 2013, mailed Jan. 22, 2013

(Continued)

*Primary Examiner* — Romain Jeanty
*Assistant Examiner* — Kurtis Gills
(74) *Attorney, Agent, or Firm* — Venable LLP

(57) ABSTRACT

A method and system for producing and distributing audio-visual content for a program such as, for example, a television program. The method includes producing the audio-visual content for a first predetermined number of program episodes and transmitting the audio-visual content for the first predetermined number of episodes to a distribution entity for display over a network to a plurality of consumers. After the first predetermined number of episodes are displayed to the plurality of consumers, the method includes receiving performance data relating to viewership of the first predetermined number of episodes by the plurality of consumers and evaluating the performance data to determine whether the performance data for a portion of the first predetermined number of episodes meets or exceeds a predetermined threshold. If the predetermined threshold is met or exceeded, an order for a second predetermined number of program episodes is automatically triggered. The first and second predetermined numbers of episodes total a syndicatable number of episodes.

24 Claims, 4 Drawing Sheets

(56) References Cited

U.S. PATENT DOCUMENTS

| | | |
|---|---|---|
| 2009/0132592 A1 | 5/2009 | Schiller |
| 2010/0057576 A1 | 3/2010 | Brodersen et al. |
| 2010/0191655 A1 | 7/2010 | Corn |
| 2012/0110607 A1 | 5/2012 | Rowland |
| 2012/0124619 A1* | 5/2012 | Rowe et al. ............... 725/32 |
| 2012/0143686 A1* | 6/2012 | Caland ................. 705/14.52 |
| 2012/0215903 A1* | 8/2012 | Fleischman et al. ......... 709/224 |
| 2012/0226595 A1* | 9/2012 | Torres ........................ 705/37 |

OTHER PUBLICATIONS

Transcript of Lionsgate Fiscal 2010 First Quarter teleconference, "Lionsgate Entertainment: The Lionsgate Fiscal 2010 Q1 Earnings Call," Aug. 11, 2009, pp. 1-24.

Transcript of Lionsgate Fiscal 2011 First Quarter teleconference, "Lionsgate Entertainment: Fiscal 2011 First Quarter Earnings," Aug. 10, 2010, pp. 1-18.

* cited by examiner

SYSTEM AND METHOD FOR PRODUCING AND DISTRIBUTING AUDIO-VISUAL CONTENT

CROSS REFERENCE TO RELATED APPLICATIONS

This application is a continuation of International PCT Application No. PCT/US2012/062333, filed Oct. 27, 2012, the entirety of which is hereby incorporated by reference.

BACKGROUND

1. Field of Invention

The present application relates to the production and distribution of audio-visual content such as, for example, a television program, and more particularly, to a system and process for producing and distributing such audio-visual content to consumers, as well as evaluating the performance of and financing the production of the content.

2. Related Art

Modern television programs are typically developed by independent television production companies (studios) or by television broadcast networks themselves. Developing a new television series, however, is an increasingly expensive and risky endeavor under the traditional television series business model, particularly for the studios. Given the large upfront costs borne by the studio, even programs that ultimately prove successful from a ratings standpoint often do not begin to yield profit for the studio until around the fifth year of distribution when the program series is finally eligible for syndication. In contrast, networks typically take on comparatively little risk on the front end of the development process and are often able to cut their losses early by cancelling a show should it fail to garner sufficient ratings in a given time slot.

According to the traditional television series business model, writers and/or creators ("executive producers") generate ideas for new television programs and then attempt to sell or pitch the basic premise to a network. For example, each summer from May to September, the major American broadcast television networks—including ABC, CBS, The CW, FOX, and NBC—receive hundreds of pitches for new shows from writers and producers. Later that fall, each network may typically request a number of scripts (e.g., about 60-70) for review based on the pitches. Then, the following January, each network typically "greenlights" (i.e., orders or authorizes) production of a limited number of "pilot" episodes based on the selected scripts. Shortly thereafter, the studios cast actors and assemble production crews to produce the pilots during so-called "pilot season." A TV pilot is a key, early step in the development of a television series, often produced at considerable expense to the studios even though there is typically no guarantee that the pilot or any resulting series will ever be aired. The pilot itself may or may not air as part of the series. In the event that the pilot airs, it may typically go through re-shoots and editing before airing.

Once produced, pilots are presented to network executives and, in some cases, to test audiences. Based on feedback received during the pilot process, each network may choose several pilots for series status which are, in turn, typically presented in May at the networks' annual "upfronts" meeting, so named because of its main purpose: to allow marketers to buy television commercial airtime "up front", i.e., several months before the fall network television season begins. Those programs chosen for series status are added to network schedules for the following season. The typical network television season runs from September to June and usually includes between 22-24 episodes of a given series. By contrast, the cable television season is typically shorter (e.g., over the winter or summer) and with fewer episodes such as, for example, 10-13 episodes. Networks typically order 13 initial episodes for the first season of a new series with an option for an additional number of episodes (e.g., 9 or 11) to complete the season. Thereafter, the network typically has an annual option to order another season (e.g., 22-24 episodes) on the same date every year.

There are customarily two types of options exercised by a network, the first being within (during) a season, and the second being for season to season. (A) Within a season, there may be different order patterns such as, for example, a network may order (i) six initial episodes, and before completion of principal photography of those episodes, the network would have the option to order seven additional episodes, or (ii) thirteen initial episodes, and before completion of principal photography of those episodes, the network would have the option to order an additional 9 episodes (commonly referred to as the "back 9"). The option is typically exercised during production in order to benefit from the continuation of production, which is costly to mount and coordinate. (B) For season to season, a network will typically have an option, usually within 2 to 12 months after delivery of the episodes of a season, to order additional seasons, in its sole discretion. Generally, a studio has no authority or basis to force the network to buy subsequent seasons.

The costs of production and proceeds from a television series are respectively borne and distributed depending upon who is "producing" the program. Often, a television studio may pay the costs of producing a program for a network, including the creative, writing and production staff, in return for receiving a license fee from the network for the right to air the show, along with a percentage of potential syndication proceeds in the future. The network then sells advertising spots during the television show with the expectation that advertising revenues will exceed the license fees and other network-related expenses. Unless negotiated otherwise, the network usually decides when to air the program and for how long the show will air. Thus, at any step, a show can be tossed out by a network with little or no recourse for the studio. For example, a network that orders a script hasn't committed to a pilot. Likewise, a network that orders a pilot hasn't committed to a series. In this regard, the traditional business model favors networks by providing a series of options: an option to receive a pitch, an option to receive a script, an option to greenlight production of a pilot, and an option to have a series produced by the studio. Subsequently, the network has the option of picking up additional episodes during airing of the initial series episodes and also typically has an annual option to continue the series for one or more new seasons.

Generally speaking, American television production companies have been willing to bear the front end costs and risk of producing a pilot and the first few years of a television series in the hopes that the series ultimately runs long enough to sell into syndication. Off-network syndication, more commonly known as "reruns," typically involves the licensing of a program series that was originally run on network television. Studios rely on syndication to recoup production and other costs and generate profit and, therefore, naturally have a desire to expedite the path to syndication. At a minimum, enough episodes of the series must exist to allow for continual strip (daily) syndication over the course of several months without repeating episodes. Furthermore, the number of episodes available affects the overall price for syndication rights. For example, one hundred (100) episodes is a traditional threshold at which point a television series becomes viable for daily syndication—enough to fill a daily Monday-to-Friday schedule for 20 weeks without repeating an episode. Thus, syndication typically doesn't begin until after about the fourth season of a series. In some cases, however, for example in the context of children's programming, a 65-episode block is often sufficient since it allows for a 13-week cycle of daily showings with only four repeats per year (once per quarter). Syndication packages may contain some or all episodes from a series, and are usually licensed to as many television stations and markets as possible. Sitcoms and game shows have typically proven most successful in syndication because they are less serialized and can, therefore, be run non-sequentially without significantly impacting viewership.

Whether a network will continue to air a particular television program as well as the determination regarding how much advertising spots can be sold for is based on viewership, and more specifically ratings among particular demographics. There are known entities and metrics to assess a TV program's popularity and its viewing demographics. The market standard for audience measurement systems is the Nielsen Company's Nielsen ratings. Nielsen utilizes technology and viewer diaries to track viewing behavior down to the second, revealing detailed programming and commercial engagement. For TV, Nielsen ratings are coupled with detailed analysis of consumer viewing behavior and demographic information. The ratings allow networks to refine advertising campaigns based on demographics, day-part and audience composition. Such metrics are used to determine popularity of content in a set demographic and if content is successful a network drives certain advertisements to those demographics and also may assist a network in deciding whether to order more episodes.

SUMMARY

In view of rising production costs, competition, an uncertain economy, and overall lack of certainty in terms of ever reaching profitability, television production studios are searching for different and more efficient ways to continue creating and distributing quality television programs. Therefore, there is a need for a system and method that enables production studios and networks to reduce risk and proactively guarantee an order for a significant number of additional episodes upon meeting a predefined viewership threshold while concurrently increasing the probability that the additional episodes will be successful in the relevant market. A need also exists for the studios to expedite syndication and thus realize profit quicker.

In accordance with an embodiment of the invention, a method is provided for producing and distributing audio-visual content. The method may include the steps of: producing the audio-visual content for a first predetermined number of program episodes; transmitting the audio-visual content for the first predetermined number of program episodes to a distribution entity for display over a network to a plurality of consumers; receiving performance data relating to viewership of the first predetermined number of program episodes by the plurality of consumers after the first predetermined number of program episodes are displayed to the plurality of consumers; evaluating the performance data to determine whether the performance data for a portion of the first predetermined number of episodes meets or exceeds a predetermined threshold, wherein, if the predetermined threshold is met or exceeded, an order for a second predetermined number of program episodes is automatically triggered, wherein the first and second predetermined numbers of program episodes total a syndicatable number of episodes.

In accordance with an embodiment, a system for carrying out the foregoing method is provided including a computer or computers.

In accordance with another embodiment of the invention, a method is provided for receiving and distributing produced audio-visual content. The method may include the steps of: receiving the produced audio-visual content for a first predetermined number of program episodes from a content production entity; displaying the produced audio-visual content for the first predetermined number of program episodes over a network to a plurality of consumers; receiving performance data relating to viewership of the first predetermined number of program episodes by the plurality of consumers after displaying the first predetermined number of program episodes to the plurality of consumers; evaluating the performance data to determine whether the performance data for a portion of the first predetermined number of episodes meets or exceeds a predetermined threshold; automatically ordering a second predetermined number of program episodes if the predetermined threshold is met or exceeded, wherein the first and second predetermined numbers of program episodes total a syndicatable number of episodes.

In accordance with still another embodiment, a system for carrying out the foregoing method is provided including a computer or computers.

Further features and advantages, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of some embodiments of the invention, as illustrated in the accompanying drawings. Several embodiments of the invention will be described with respect to the following drawings, in which like reference numerals represent like features throughout the figures, and in which.

DETAILED DESCRIPTION

Some embodiments of the invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the invention.

Figure 1:
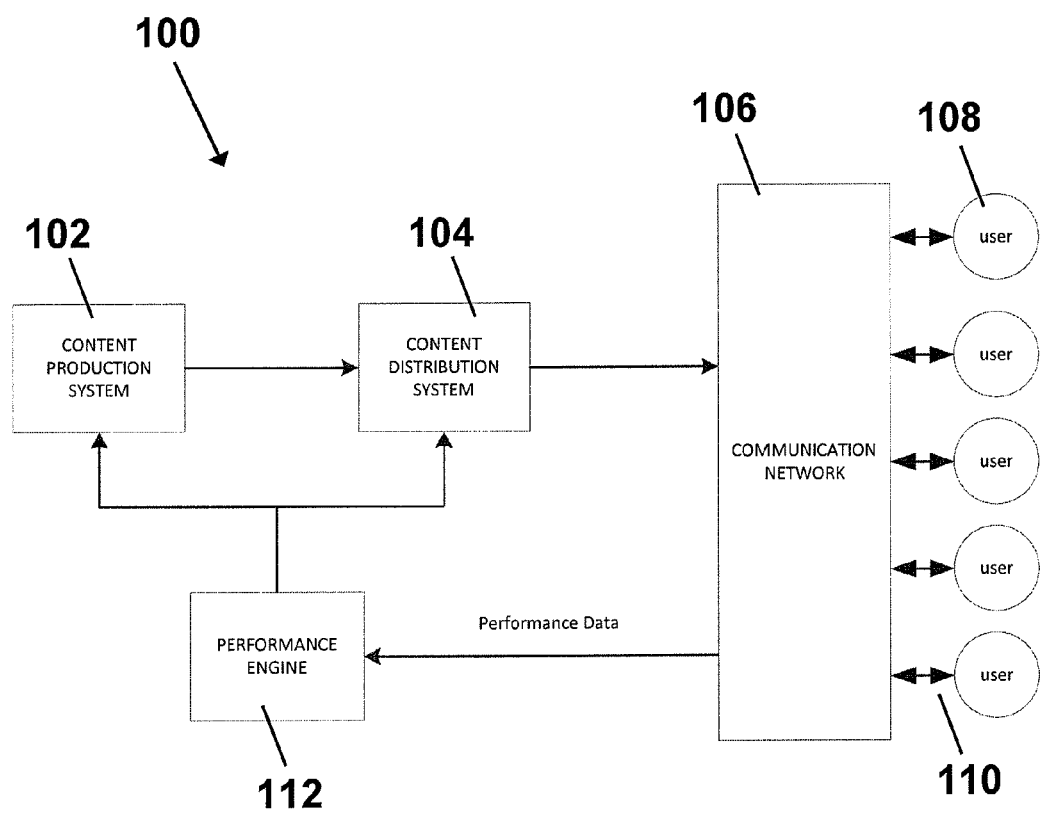
FIG. 1 schematically depicts an illustrative system architecture for producing and distributing audio-visual content according to an embodiment of the invention.

FIG. 1 schematically depicts an illustrative system architecture 100 for producing and distributing audio-visual content according to an embodiment of the invention. As shown in FIG. 1, the system 100 may include a content production system 102, a content distribution system 104, a communication network 106, a plurality of audio-visual content consumers or users 108, and a performance engine 112. The content production system 102 may be associated with a television production studio and may be configured to produce audio-visual content for a predetermined number of television program episodes according to, for example, a previously negotiated agreement with a television network, i.e., a content distribution entity 104, as discussed in further detail below. The content production system 102 may include, for example but not limited to, one or more digital audio-visual recording devices, computer-based editing equipment and other devices utilized in television recording and production as would be understood by one of ordinary skill in the art. The content production system 102 may include, for example but not limited to, one or more computers or computer systems that include computer software, stored on computer-readable media. The computer software may comprise an order processing engine that performs one or more steps of the method described herein.

After, or during, creation of a predetermined number of episodes by the content production system 102, the produced audio-visual content may be transmitted (delivered) to a content distribution entity or system 104. The transmitted audio-visual content may include identification information, for example, that uniquely identifies the audio-visual content. The content distribution entity or system 104 may be, for example, a television broadcast network in privity with the content producer 102 (i.e., the television production studio), and may be obligated by contract to receive and display the transmitted audio-visual content to a plurality of consumers 108 via a communication network 106. The content distribution system 104 may include, for example but not limited to, one or more computers or computer systems that include computer software, stored on computer-readable media. The computer software may comprise an order processing engine that performs one or more steps of the method described herein. The communication network 106 may include one or more of a cable television network, a satellite television network, a wired or wireless Internet-based communication network, and/or an over-the-air (OTA) television broadcast system, or the like.

A two-way communication link 110 between consumers 108 and communication network 106 may allow forward transmission of the produced audio-visual content to consumers 108 as well as return transmission of viewership information and performance data (e.g., Nielsen ratings) for each transmission of the television episode embodied by the audio-visual content. The communication link 110 may include, for example but not limited to, cable (conventional coaxial copper wire), fiber optic cable, OTA, Digital Subscriber Line (DSL), or the like, and may be wired or wireless. Processes and devices for the collection and transmission of the performance data from Network consumers is readily understood by one of ordinary skill in the art and will not be discussed in further detail herein. The performance data may be electronically or manually transmitted back via the communication network 106 to a performance engine 112. The performance engine 112 may be, for example, a computer-based receiving system housed within or remote from any of the content production system 102, the content distribution system 104, or a third party performance data evaluation entity such as, for example, the Nielsen Company of New York, N.Y. USA, and which is configured to receive and process the performance data to generate meaningful reports regarding measured viewership of the audio-visual content by the consumers 108. The measured viewership may be based on specific geographies, demographics, etc., or, alternatively, could include total (unfiltered) viewership data. As shown in FIG. 1, raw performance data and/or formatted reports regarding such data may then be transmitted back to one or both of the content production system 102 and the content distribution system 104 for evaluation by one or both of the content production system 102 and the content distribution system 104.

Once a predetermined amount of program episodes have been produced by the content production entity 102 and displayed to the plurality of consumers 108 by the content distribution entity 104 in accordance with the previously negotiated agreement, one or both of the content production system 102 and the content distribution system 104 compares the received performance data with a predetermined threshold provided in the negotiated agreement. For example, the one or more computers or computer systems of the content production system 102 may receive the performance data. The one or more computers or computer systems of the content production system 102 may evaluate the received performance data by comparing the received performance data to the predetermined threshold, which may be stored in a database of the one or more computers or computer systems of the content production system 102. Alternatively or concurrently, the one or more computers or computer systems of the content distribution system 104 may receive the performance data. The one or more computers or computer systems of the content distribution system 104 may evaluate the received performance data by comparing the received performance data to the predetermined threshold, which may be stored in a database of the one or more computers or computer systems of the content distribution system 104.

The received performance data and the stored predetermined threshold may include the content identification information to enable the one or more computers or computer systems to identify the data and process the comparison. The predetermined threshold and the associated content identification information may have been entered into the database of the content production system 102 and/or the content distribution system 104, for example, after the content production system 102 and the content distribution system 104 negotiated the agreement for the predetermined number of television program episodes. If the predetermined threshold is determined to be met or exceeded, an order for a second predetermined amount of program episodes by the content distribution entity 104 is automatically triggered at which time the content production entity 102 begins production of the audio-visual content for the second predetermined amount of program episodes and transmits the produced episodes, individually or in blocks, to the content distribution entity 104 for display to the plurality of consumers 108. The automatically triggered order for the second predetermined amount of program episodes may be akin to a put for the content distribution entity 104.

The one or more computers or computer systems of the content production system 102 may trigger the order, for example, by the order processing engine of the content production system 102 querying its database with the content identification information of the received performance data to locate the associated predetermined threshold, comparing the performance data against the predetermined threshold located in the database query, and if the outcome of the comparison indicates that the performance data meets or exceeds the located predetermined threshold, sending a message to the content distribution system 104 that the predetermined threshold has been met. The message sent to the content distribution system 104 may include the content identification information to thereby identify the content for which the automatic order was generated. Alternatively or concurrently, the one or more computers or computer systems of the content distribution system 104 may trigger the order, for example, by the order processing engine of the content distribution system 104 querying its database with the content identification information of the received performance data to locate the associated predetermined threshold, comparing the performance data against the predetermined threshold located in the database query, and if the outcome of the comparison indicates that the performance data meets or exceeds the located predetermined threshold, sending a message to the content production system 102 that the predetermined threshold has been met. The message sent to the content production system 102 may include the content identification information to thereby identify the content for which the automatic order was generated.

Figure 2:
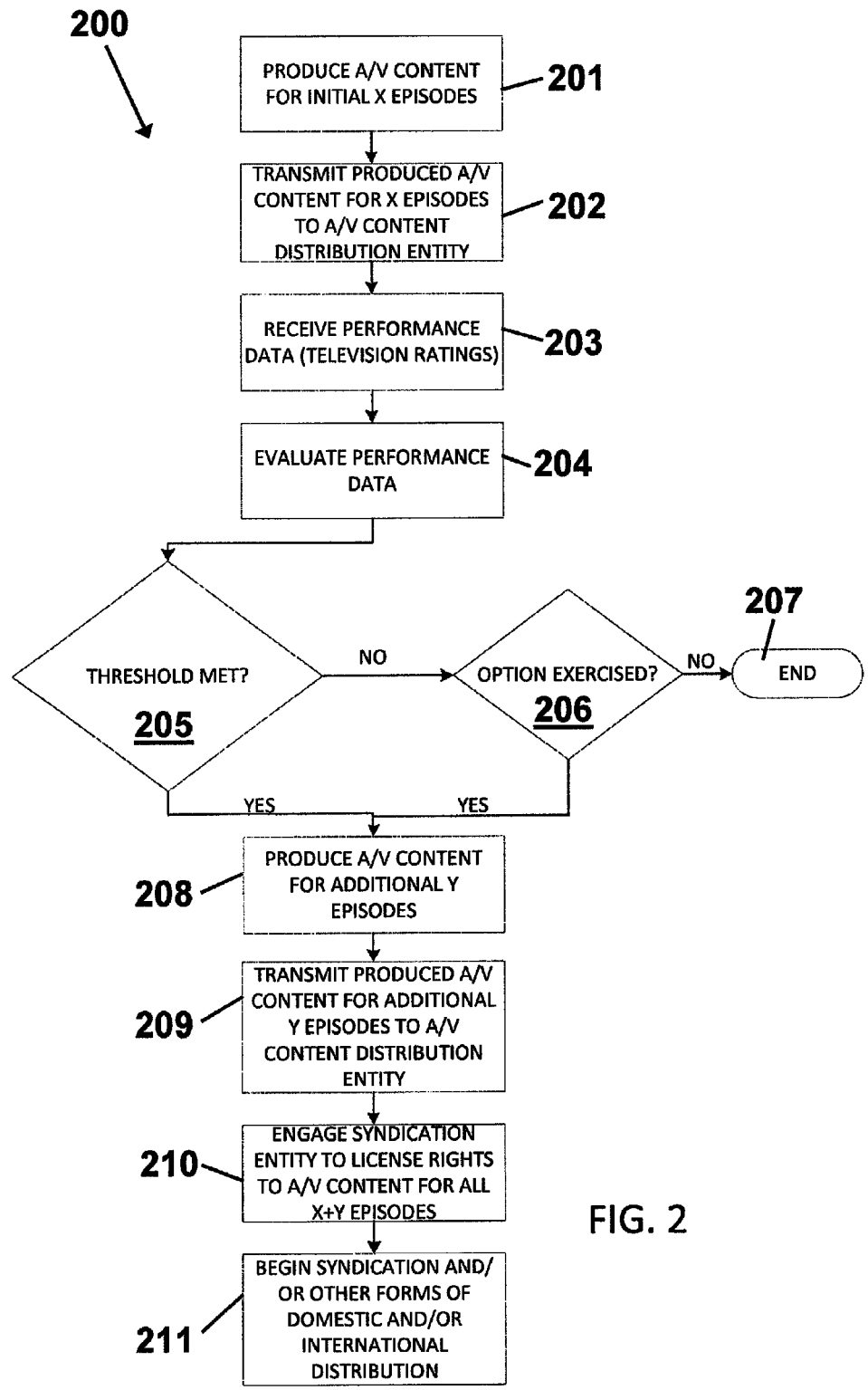
FIG. 2 depicts a schematic flow diagram for producing and distributing audio-visual content according to an embodiment of the invention.

FIG. 2 depicts a schematic flow diagram 200 for producing and distributing audio-visual content utilizing the system architecture 100 of FIG. 1 according to an embodiment of the invention. In an example embodiment, prior to beginning the process shown in FIG. 2, the content producing entity 102 and content distribution entity 104 (see FIG. 1) may have engaged in a negotiation to reach a contractual agreement regarding the nature of the audio-visual content to be produced and distributed as well as terms surrounding such production and distribution. For example, the content producing entity 102 may have pitched a concept for a new television series to the content distribution entity 104. According to an embodiment, the pitch may have been made without a script or a pilot episode. The content production entity 102 and the content distribution entity 104 may have agreed to production of a first predetermined number of television program episodes such as, for example but not limited to, ten (10) episodes of the series at a first set price per episode. The content production entity 102 and the content distribution entity 104 may have also agreed that the content distribution entity 104 is required to receive and air (distribute) each and every one of the first predetermined number of episodes. The content production entity 102 and the content distribution entity 104 may have also agreed to a predetermined threshold regarding minimum measured performance data of a portion or subset of the first predetermined number of episodes after distribution of the same to television consumers 108 (see FIG. 1). The portion or subset of the first predetermined number of episodes may include at least one episode and less than all of the first predetermined number of episodes. Alternatively, the predetermined threshold could include minimum measured performance data of all of the first predetermined number of episodes after distribution of the same to television consumers 108. The content production entity 102 and the content distribution entity 104 may have also agreed that, in the event the measured performance data of the portion of the first predetermined number of episodes meets or exceeds the predetermined threshold, the content distribution entity 104 will be required to order production and delivery of a second predetermined number of television program episodes. The second predetermined number of episodes may be an amount of episodes sufficient to create a total syndicatable number of episodes when combined with the first predetermined number of episodes. The total syndicatable number of episodes may be, for example, at least sixty-five (65) episodes and, more preferably, one hundred (100) episodes. According to an embodiment, where the first predetermined number of episodes includes, for example, ten (10) episodes, the second predetermined number of television program episodes may include, for example but not limited to, at least fifty-five (55) episodes and, more preferably, ninety (90) episodes of the series at a second set price per episode.

As shown in the embodiment depicted in FIG. 2, in step 201, the content producing entity 102 produces the audio-visual content for the predetermined amount of program episodes. One of ordinary skill in the television production arts will understand how such audio-visual content is produced including, for example, capture on a tangible medium, editing, formatting for transmission, etc. In step 202, the content producing entity 102 transmits the produced audio-visual content to the content distribution entity 104 via known means such as, for example, via a secure data network or manually on a tangible computer readable storage medium. The transmission in step 202 may include transmission of individual episodes separately upon completion or, alternatively, bundled transmission of all of the audio-visual content associated with the first predetermined number of episodes. The content distribution entity 104 may then transmit the produced audio-visual content as individual episodes to the plurality of consumers 108 via the communication network 106 (see FIG. 1).

In step 203, one or both of the content producing entity 102 and the content distribution entity 104 may receive performance data relating to the plurality of consumers 108 after each of the predetermined amount of program episodes are displayed to the plurality of consumers 108. The performance data may be measured ratings information received, evaluated, and/or formatted by a third party performance data evaluation entity such as, for example, the Nielsen Company of New York, N.Y. USA. The performance engine 112 (see FIG. 1) may be a computer or computer system configured to receive and process the performance data to generate meaningful reports regarding measured viewership of the audio-visual content by the end consumers 108.

In step 204, one or both of the content producing entity 102 and the content distribution entity 104 may evaluate the performance data to determine whether the performance data for the first predetermined number of episodes or a subset thereof such as, for example but not limited to, excluding a first episode and a second episode of the predetermined amount of episodes, meets or exceeds the agreed predetermined threshold. The evaluation step 204 may comprise a comparison of the performance data with the predetermined threshold as depicted in step 205 and may be performed automatically by one or more computers associated with one or both of the content producing entity 102 and the content distribution entity 104. If the evaluation comparison at 205 indicates that the performance data meets or exceeds the threshold, the process advances to step 208. If the evaluation comparison at 205 indicates that the performance data does not meet or exceed the threshold, the process advances to step 206.

In step 206, following the determination that the predetermined threshold has not been met by the received performance data, the content distribution entity 104 is still given the option of ordering a number of additional episodes. If the content distribution entity 104 exercises the option in step 206, the process proceeds to step 207. On the other hand, if the content distribution entity 104 does not exercise the option to order production of and receive the completed audio-visual content of the additional episodes, the process proceeds to step 207 and ends. Step 207 is an indicator that production and delivery of audio-visual content from the content producing entity 102 to the content distribution entity 104 has ceased and that, if desired, the content producing entity 102 may elect to begin shopping the rights for past and future content to other content distribution entities.

In step 208, following the determination that the predetermined threshold has been met or exceeded by the received performance data, the content distribution entity 104 is deemed to have automatically and irrevocably authorized production and delivery by the content production entity 102 of the second predetermined number of episodes such as, for example but not limited to, ninety (90) episodes of the series at a second set price per episode. Accordingly, similar to production in step 201, the content production entity 102 begins producing (i.e., writing, casting, filming, etc.) the audio-visual content of the second predetermined number of episodes in step 208.

Upon completion of the audio-visual content of one or more episodes of the second predetermined number of episodes, the content production entity 102 transmits the same to the content distribution entity 104 as depicted in step 209 for display to the plurality of consumers 108 via communication network 106.

In step 210, the content production entity 102 may also begin engaging possible syndication entities to license or sell the syndication rights to the program including the produced audio-visual content of the first predetermined number of episodes as well as the partially produced and/or not yet produced audio-visual content of the second predetermined number of episodes. Given that production of the second predetermined number of episodes (e.g., 90 episodes) is automatically triggered by meeting or exceeding the predetermined threshold, the content production entity can start the process of seeking and engaging licensees for syndication much earlier since a guaranteed number of series episodes have been ordered and are required to be aired (distributed to consumers 108) by the content distribution entity 104. This, in turn, results in the possibility of realizing profits for the content production entity 102 much earlier in the process than was previously possible under the traditional paradigm.

In step 211 in FIG. 2, the content production entity 102 begins syndicating the audio-visual content of the first and second predetermined numbers of television program episodes. Such syndication may begin, for example, within three years from a date the produced audio-visual content of a first episode of the series was displayed to the plurality of consumers 108.

In comparison to the traditional television series production business model, there may be a number of advantages associated with the embodiment of the inventive process described above. First, the process obviates the traditional post-pitch steps of preparing a script and producing a pilot and, therefore, expedites the process by avoiding the dead time therebetween as well as the burden of advancing pilot production costs (often in excess of $1 mil.) for a show that may never even be seen by network consumers.

Second, given that the content distribution entity 104 (i.e., the network) effectively has a put for a predetermined number of additional episodes, the binary nature of the threshold comparison provides a level of certainty to the otherwise chaotic and inexact science of selecting new network series for production.

Third, the process allows studios to speed up the typical production schedule and make many more episodes in a shorter period of time. In addition to other efficiencies that are introduced, the primary benefit is that the syndication rights timeline is greatly accelerated. For example, in the case where the measured performance data of the first predetermined number of episodes (or some subset thereof) meets or exceeds the predetermined threshold, thus triggering automatic ordering of the second predetermined number of episodes, the new model may allow a studio to license a new series in syndication after airing only the first predetermined number of episodes (e.g., after only 10 episodes). Additional advantages: Retention of barter (certain number of commercial slots in each episode that studio owns and can sell) on all episodes. This includes barter on the original first predetermined number of episodes as well as the next (second) predetermined number of episodes which are triggered but not yet made when syndication is being licensed.

Fourth, even if the predetermined threshold is not satisfied, the content distribution entity 104 still has an option to order additional episodes, although it is not compelled to take the episodes in that circumstance. That is, unlike the customary options (e.g., post-pilot, in season, and season to season) which are in the network's sole discretion, the inventive process provides a "put" (if the predetermined threshold is met or exceeded). Even if the predetermined threshold is not met, the network may exercise an option to order additional episodes. In either case, an advantage to a network is that the per episode fee once a series is ordered is dramatically lower than the $1.5 million to $2 million per episode that has become an industry benchmark. On the flip side, the studio is taking some risk in producing both the first and second predetermined number of episodes because the license fee may only cover a portion of the production costs per episode. For instance, it may cost a studio approximately $1 million to produce each episode for which it may only get a $700 k license fee per episode. This amounts to a $300 k deficit per episode, which the studio only recoups when episodes enter additional distribution such as through syndication and DVD and Blu-ray Disc (DVD/BD) sales.

Fifth, the content production entity (studio) 102 is also guaranteed that the agreed upon first predetermined number of episodes produced will be aired to an actual network audience. Thus, it is believed that all parties will gain a better sense of whether or not a series will succeed. This is in contrast to the traditional model in which a single pilot is shown to network executives and/or a test group and which is typically never seen by the network audience even when the series is picked up.

Figure 3:
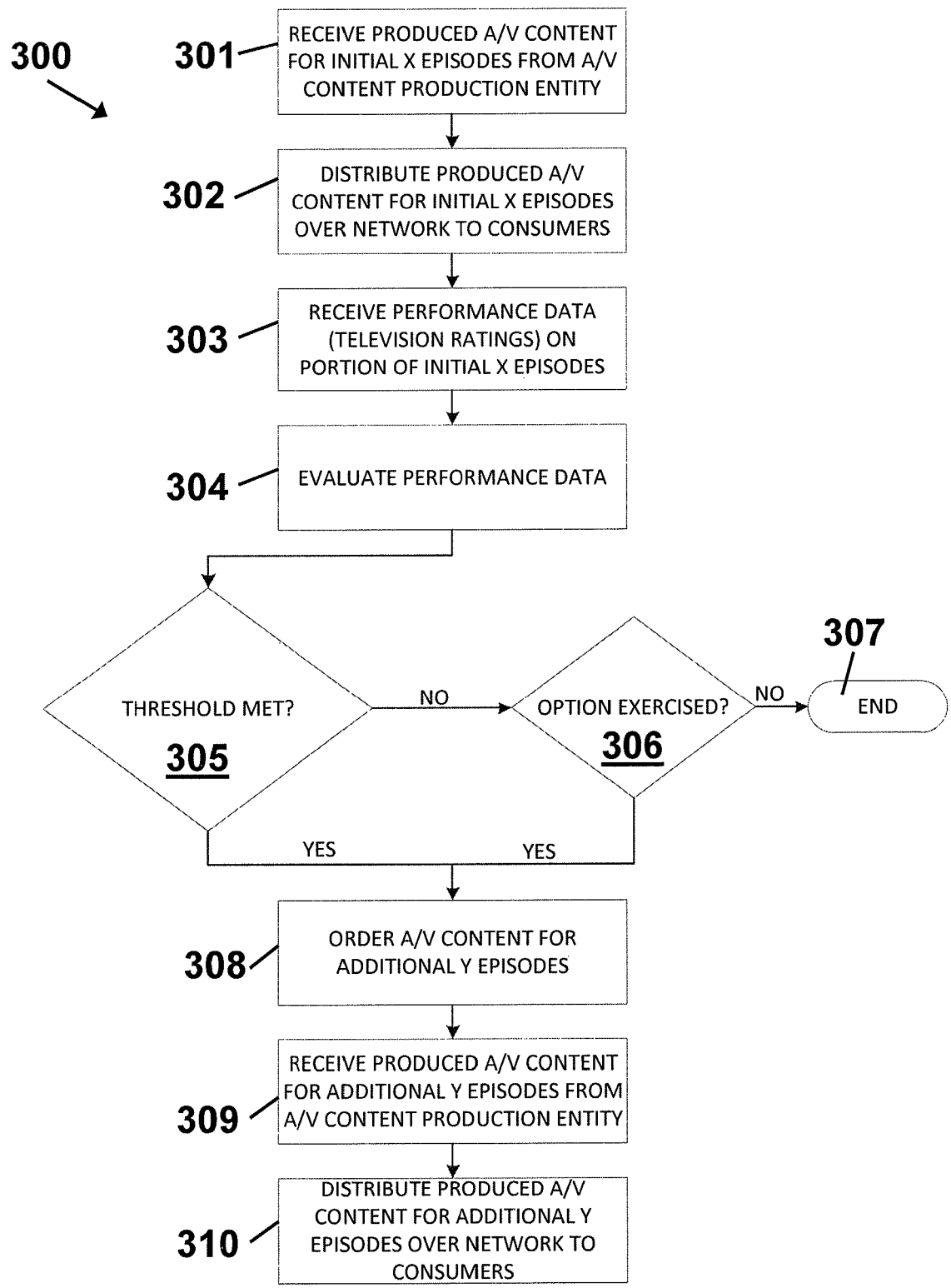
FIG. 3 depicts a schematic flow diagram for receiving and distributing produced audio-visual content according to an embodiment of the invention.

FIG. 3 depicts a schematic flow diagram 300 for receiving and distributing produced audio-visual content utilizing the system architecture 100 of FIG. 1 according to an embodiment of the invention. The process 300 for receiving and distributing produced audio-visual content may be performed, for example, by the content distribution entity 104. As shown in FIG. 3, in step 301, the content distribution entity 104 may receive the produced audio-visual content for a first predetermined number of television program episodes from a content production entity 102. The produced audio-visual content may be received by the content distribution entity 104 via known means such as, for example, via a secure data network or manually on a tangible computer readable storage medium. The receiving in step 301 may include receipt of separate transmissions of individual episodes upon completion of each or, alternatively, a bundled transmission of all of the produced audio-visual content associated with the first predetermined number of episodes.

In step 302, the content distribution entity 104 distributes or displays the produced audio-visual content for the first predetermined number of television program episodes over communication network 106 to a plurality of consumers 108. In an embodiment, the audio-visual content for the first predetermined number of program episodes may be transmitted directly from the content production entity 102 over communication network 106 to the plurality of consumers 108.

In step 303, one or both of the content producing entity 102 and the content distribution entity 104 may receive performance data relating to the plurality of consumers 108 after displaying each of the predetermined amount of program episodes to the plurality of consumers 108. The performance data may be measured ratings information received, evaluated, and/or formatted by a third party performance data evaluation entity such as, for example, the Nielsen Company of New York, N.Y. USA. The performance engine 112 (see FIG. 1) may be a computer or computer system configured to receive and process the performance data to generate meaningful reports regarding measured viewership of the audio-visual content by the end consumers 108.

In step 304, one or both of the content producing entity 102 and the content distribution entity 104 may evaluate the performance data to determine whether the performance data for the first predetermined number of episodes or a subset thereof such as, for example but not limited to, excluding a first episode and a second episode of the predetermined amount of episodes, meets or exceeds an agreed predetermined threshold. The evaluation step 304 may comprise a comparison of the performance data with the predetermined threshold as depicted in step 305 and may be performed automatically by one or more computers associated with one or both of the content producing entity 102 and the content distribution entity 104. If the evaluation comparison at 305 indicates that the performance data meets or exceeds the threshold, the process advances to step 308. If the evaluation comparison at 305 indicates that the performance data does not meet or exceed the threshold, the process advances to step 306.

In step 306, following the determination that the predetermined threshold has not been met by the received performance data, the content distribution entity 104 is still given the option of ordering a number of additional episodes. If the content distribution entity 104 exercises the option in step 306, the process proceeds to step 307. On the other hand, if the content distribution entity 104 does not exercise the option to order production of and receive the completed audio-visual content of the additional episodes, the process proceeds to step 307 and ends. Step 307 is an indicator that receipt of audio-visual content from the content producing entity 102 by the content distribution entity 104 has ceased.

In step 308, following the determination that the predetermined threshold has been met or exceeded by the received performance data, the content distribution entity 104 automatically orders production and delivery by the content production entity 102 of the second predetermined number of episodes such as, for example but not limited to, ninety (90) episodes of the series at a second set price per episode.

In step 309, the content distribution entity 104 receives the produced audio-visual content for at least a portion of the ordered second predetermined number of episodes for display to the plurality of consumers 108 via communication network 106. As shown in step 310, the content distribution entity 104 must distribute to the plurality of consumers 108 via communication network 106 all produced audio-visual content for the second predetermined number of episodes received from the content production entity 102.

Figure 4:
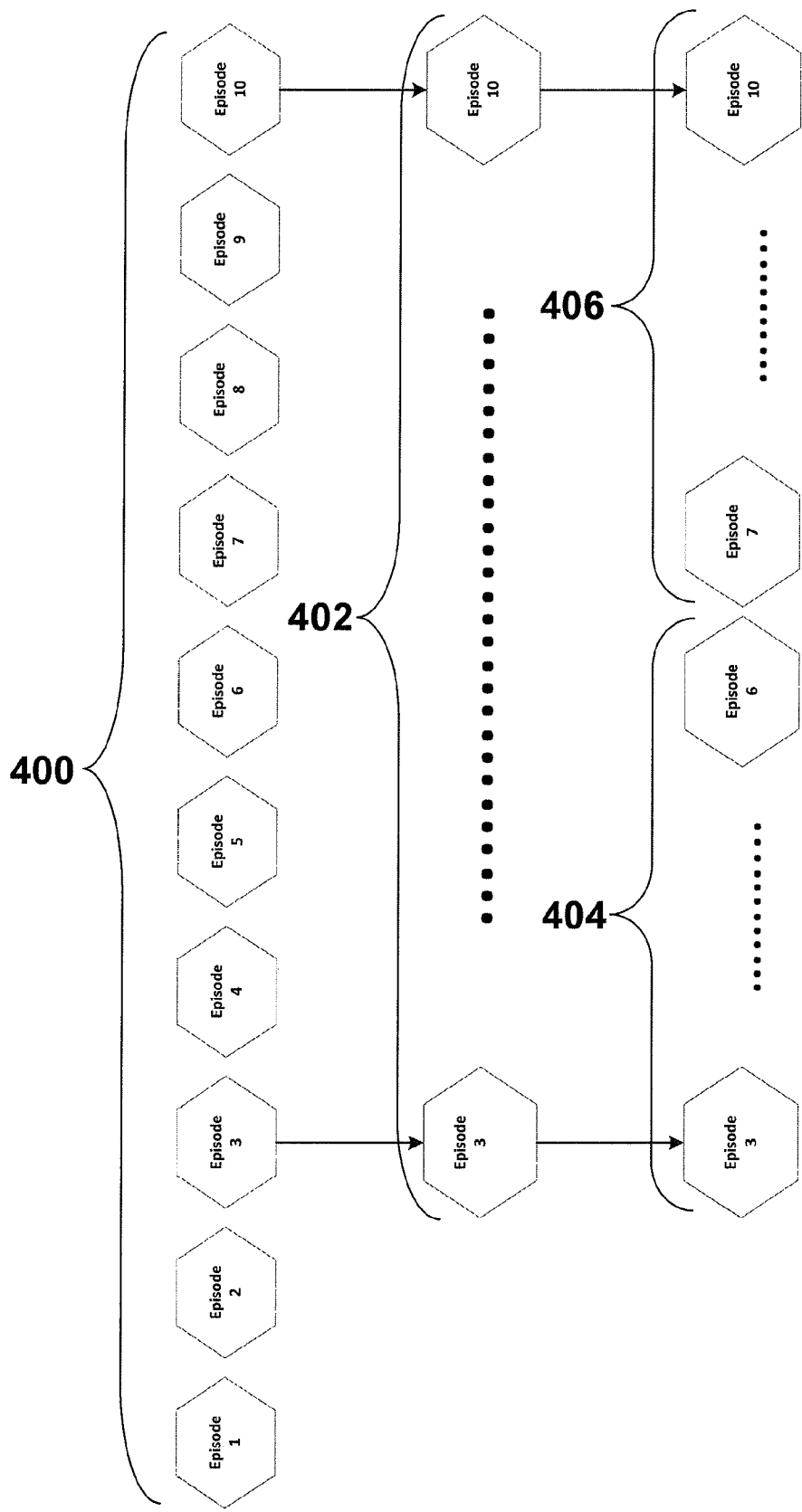
FIG. 4 depicts an exemplary episode breakdown of the produced and distributed audio-visual content.

FIG. 4 depicts an exemplary episode breakdown according to an exemplary embodiment of the invention. In the episode breakdown shown in FIG. 4, it is assumed that a production studio and a network negotiated an agreement in accordance with an embodiment of the invention. The agreement may include the following terms:

Ten (10) initial episodes (shown in FIG. 4 as the first predetermined number of episodes 400) purchased by the network at a first cost per episode. The network is obligated to air all ten initial episodes in an agreed upon time slot (e.g., primetime 8-11 pm).

Predetermined threshold (Nielsen ratings results—performance data) set as:

A first subset of the first predetermined number of episodes 400 may include episodes 3-10 (grouped in FIG. 4 as 402) must average c3 A18-49 impressions of 1.3 mm; and Second and third subsets of the first predetermined number of episodes 400 may include episodes 3-6 (grouped in FIG. 4 as 404) and episodes 7-10 (grouped in FIG. 4 as 406), respectively. The third subset 406 holding at least 80% of the live+SD A18-49 impressions of the average of the second subset 404, where "c3 A18-49" refers to the ratings for average commercial minutes in live programming plus three days of digital video recorder playback for the age 18-49 viewer segment, and where "live+SD A18-49" refers to live-plus-same-day data stream for the age 18-49 viewer segment.

If the predetermined threshold is met or exceeded, the second predetermined number of episodes is, for example, ninety (90) episodes.

As will be understood by one skilled in the art, references in the present application to computer systems include software applications stored in and/or run by the computer systems, and the computer systems may be managed and/or administered by independent entities. Furthermore, references herein to individual entities should be understood to encompass and include the respective entity as well as agents of the respective entity and/or instruments controlled by the respective entity, such as computer systems, institutions, and the like. Additionally, the plural computer systems of the various exemplary embodiments may be located in geographically remote locations and linked via data communication networks, or may be integrated into one or more components or combinations of components located in close proximity. The various computer systems of the embodiments of the present application may include software modules stored in and/or run by computer systems, or may include separate, stand-alone computer components that are networked and/or interfaced with other computer systems.

As will be appreciated by one skilled in the art, the terms "computer," "computer system," and "network" as used herein may include a variety of combinations of fixed and/or portable computer hardware, software, peripherals, and storage devices. Generally each computer system identified herein may include at least a processor, random-access memory, a local or remote storage device, and peripherals such as keyboards, mice, printers, and monitors for enabling input and output of information to and from each computer system. Software routines and/or programs may be embedded and/or stored in the storage devices and run by the processors. Each network identified herein may include wired or wireless communication lines and associated conventional hardware devices used in transmitting, receiving, and routing data, such as routers, switches, hubs, interfaces, and the like.

The hardware and software components of the computer systems of the present application may include and may be included within fixed and portable devices including desktop, laptop, server, personal digital assistant, media player, telephone, smart phone, clock, watch, television, compact disc, digital video disc, radio, audio and video recording, replaying, download-capable, streaming, and any other suitable communication devices.

Storage devices of the exemplary systems of the present application may include devices for storing data electronically, such as hard drive devices, storage servers, storage-area networks, fibre channel storage networks, RAID configurations, optical media drives, holographic media drives, tape media drives, magnetic storage media, flash memory devices, and the like.

The processors of each of the plural computer systems may run software applications including operating systems such as UNIX, BSD, Linux, OS/2, VMS, console, and Microsoft applications, as well as database applications, networking applications, web server applications, file server applications, mail server applications, and the like.

The plural computer systems may also each be configured to function as a web server for delivering information via TCP/IP protocol and/or Internet interface. The information transmitted by the web server may include web page information identified by universal resource locators ("URLs"), and formatted in Hyper Text Markup Language ("HTML") or a similar formatting language in response to requests received via data communication networks. The web page information may also include information formatted using Dynamic HTML ("DHTML"), Extensible Markup Language ("XML"), Java, JavaScript, and the like. Alternatively, the web server may be configured to provide information utilizing Wireless Access Protocol ("WAP") to a WAP-enabled device such as a cellular telephone, personal digital assistant ("PDA"), and the like. Web server functions may be performed through utilization of web server applications such as Apache, Netscape, and Microsoft web server applications in conjunction with Common Gateway Interface ("CGI") applications. The CGI applications may perform tasks related to receiving and sending data packets to other computer systems via communication networks, and may additionally perform communication with the database applications in accordance with information received from the communication networks. The CGI applications may include programs written, for example, using programming languages such as C, C++, Java, Perl, Python, and shell scripts. Additionally, the web server applications may incorporate or may be associated with data encryption applications including Secure Socket Layer ("SSL") and/or Transport Layer Security ("TLS") applications for providing endpoint authentication and communications privacy using cryptography, and secure shell ("SSH") applications for encrypted communications, tunneling, forwarding ports, and transferring data files. The web server applications may additionally provide web services, and the web services may be provided via private communication networks and/or public communication networks such as the Internet.

The plural computer systems may additionally run database applications, and the database applications may be utilized to build and manage databases. The database applications may include relational database management systems, such as applications developed by Oracle, IBM, and the like.

Communication between the plural computer systems of the present application may be performed using wired or wireless communication lines, and may be performed using any suitable analog or digital communication protocol including TCP/IP, UDP, GSM, GPRS, EDGE, WAP, 3G/UMTS, CDMA, TDMA, SMS, and the like. Utilization of computer hardware and software components and performance of communication between the various components is well-known in the art, and will therefore not be described in greater detail herein.

While various embodiments of the present invention have been described herein, it should be understood that they have been presented by way of example only, and not limitation. Thus, the breadth and scope of the present invention should not be limited by any of the described embodiments, but should instead be defined only in accordance with the following claims and their equivalents.

What is claimed is:

1. A method for producing and distributing audio-visual content, comprising:
    producing, via one or more computer systems, the audio-visual content for a first predetermined number of program episodes, wherein the one or more computer systems includes one or more audio-visual recording devices and one or more editing devices;
    transmitting, via the one or more computer systems, the audio-visual content for the first predetermined number of program episodes to a distribution entity for display over a network to a plurality of consumers;
    receiving, via the one or more computer systems, performance data relating to viewership of the first predetermined number of program episodes by the plurality of consumers after the first predetermined number of program episodes are displayed to the plurality of consumers;
    evaluating, via the one or more computer systems, a portion of the received performance data to determine whether the performance data for the portion of the first predetermined number of episodes meets or exceeds a predetermined threshold; and
    automatically requesting production, via the one or more computer systems, of a second predetermined number of program episodes after the predetermined threshold is met or exceeded, wherein the first and second predetermined numbers of program episodes total a syndicatable number of episodes.

2. The method as set forth in claim 1, further comprising:
    producing audio-visual content for at least a portion of the second predetermined number of program episodes after the predetermined threshold is met or exceeded; and
    transmitting the audio-visual content for the portion of the second predetermined number of program episodes to the distribution entity for display over the network to the plurality of consumers.

3. The method as set forth in claim 1, wherein the first predetermined number of program episodes comprises ten television program episodes.

4. The method as set forth in claim 1, wherein the portion of the first predetermined number of episodes comprises a first subset including episodes 3-10.

5. The method as set forth in claim 4, wherein the portion of the first predetermined number of episodes comprises a second subset including episodes 3-6 and a third subset including episodes 7-10.

6. The method as set forth in claim 5, wherein the predetermined threshold comprises the third subset holding a percentage of an average second impression of the second subset.

7. The method as set forth in claim 6, wherein the second impression includes ratings for average commercial minutes in live programming plus three days of digital video recorder playback for 1.3 million viewers aged 18-49.

8. The method as set forth in claim 7, wherein the second impression includes live-plus-same-day data stream for the age 18-49 viewer segment.

9. The method as set forth in claim 8, wherein the predetermined threshold comprises the third subset holding at least 80% of the second impression.

10. The method as set forth in claim 1, wherein the second predetermined number of program episodes comprises at least fifty-five program episodes.

11. The method as set forth in claim 1, wherein the second predetermined number of program episodes comprises ninety program episodes.

12. The method as set forth in claim 1, wherein the first predetermined number of program episodes comprises ten program episodes, and wherein the second predetermined number of program episodes comprises at least fifty-five program episodes.

13. The method as set forth in claim 1, wherein the second predetermined number of program episodes comprises ninety program episodes.

14. The method as set forth in claim 1, wherein the performance data comprises rating data.

15. The method as set forth in claim 14, wherein the rating data is Nielson data.

16. The method as set forth in claim 1, wherein the syndicatable number of episodes comprises at least sixty-five episodes.

17. The method as set forth in claim 1, wherein the syndicatable number of episodes comprises approximately one hundred episodes.

18. The method as set forth in claim 1, further comprising:
engaging at least one syndication outlet for the audio-visual content of the first and second predetermined numbers of program episodes upon the portion of the first predetermined number of episodes meeting or exceeding the predetermined threshold.

19. The method as set forth in claim 1, wherein after the predetermined threshold is met or exceeded, receiving payment from the distribution entity for the second predetermined number of program episodes.

20. The method as set forth in claim 19, further comprising crediting the distribution entity a predetermined percentage of the payments after the performance data for a portion of the second predetermined number of program episodes is equal to or lower than a second predetermined threshold.

21. The method as set forth in claim 20, wherein the second predetermined threshold is a predetermined amount of ratings for average commercial minutes in live programming plus three days of digital video recorder playback for consumers aged 18-49.

22. A method for receiving and distributing produced audio-visual content, comprising:
receiving, via one or more computer systems, the produced audio-visual content for a first predetermined number of program episodes from a content production entity;
displaying, via the one or more computer systems, the produced audio-visual content for the first predetermined number of program episodes over a network to a plurality of consumers;
receiving, via the one or more computer systems, performance data relating to viewership of the first predetermined number of program episodes by the plurality of consumers after displaying the first predetermined number of program episodes to the plurality of consumers;
evaluating, via the one or more computer systems, a portion of the received performance data to determine whether the performance data for the portion of the first predetermined number of episodes meets or exceeds a predetermined threshold; and
automatically requesting production, via the one or more computer systems, of a second predetermined number of program episodes after the predetermined threshold is met or exceeded, wherein the first and second predetermined numbers of program episodes total a syndicatable number of episodes.

23. The method as set forth in claim 22, further comprising:
receiving produced audio-visual content for a portion of the second predetermined number of program episodes from the content production entity; and
displaying the produced audio-visual content for the portion of the second predetermined number of program episodes over the network to the plurality of consumers.

24. The method as set forth in claim 1, wherein the predetermined threshold comprises the first subset averaging a first impression.

\* \* \* \* \*